United States Patent [19]

Dehne

[11] 4,405,042

[45] Sep. 20, 1983

[54] COMBINATION ENCLOSURE/SUPPORT FOR CONVEYOR APPARATUS, AND METHODS OF CONSTRUCTING AND UTILIZING SAME

[75] Inventor: Clarence A. Dehne, Farmington, Mich.

[73] Assignee: Jervis B. Webb Company, Farmington Hills, Mich.

[21] Appl. No.: 256,117

[22] Filed: Apr. 21, 1981

Related U.S. Application Data

[63] Continuation of Ser. No. 83,405, Oct. 10, 1979, abandoned.

[51] Int. Cl.³ .............................................. B65G 17/38
[52] U.S. Cl. .................................................. 198/687
[58] Field of Search ............... 198/477, 678, 683, 684, 198/685, 687, 840, 686; 104/172 S, 172 BT, 172 C

[56] References Cited

U.S. PATENT DOCUMENTS

| 2,931,486 | 4/1960 | Zebarth | 198/687 X |
| 3,390,641 | 7/1968 | Jacoby | 104/280 X |

FOREIGN PATENT DOCUMENTS

| 1477710 | 3/1967 | France | 198/687 |
| 1097032 | 12/1967 | United Kingdom | 198/678 |

Primary Examiner—Robert C. Watson
Assistant Examiner—Douglas D. Watts
Attorney, Agent, or Firm—Irving M. Weiner; Pamela S. Burt; John L. Shortley

[57] ABSTRACT

A track member for use in a track arrangement of a power driven overhead trolley conveyor apparatus, each track member including an upper enclosure which receives wheels of trolley load support members of the apparatus, and an integral lower enclosure which encloses an endless drive chain of the apparatus. The track members are longitudinally joined to form a continuous overhead track arrangement which encloses the trolley wheels, as well as the chain support portion, of trolley members riding therealong.

2 Claims, 4 Drawing Figures

COMBINATION ENCLOSURE/SUPPORT FOR CONVEYOR APPARATUS, AND METHODS OF CONSTRUCTING AND UTILIZING SAME

This is a continuation of application Ser. No. 83,405, filed Oct. 10, 1979 now abandoned.

BACKGROUND OF THE INVENTION

1. Field of the Invention

The present invention relates generally to a track member for use in a track arrangement of a power driven overhead conveyor apparatus, the track member including an upper enclosing support portion for trolley members conveyed by the apparatus, and an integral lower chain enclosure for a driving chain of the apparatus.

More particularly, the track member in accordance with the present invention forms a part of a generally horizontal continuous overhead track formed by longitudinally joining a plurality of the track members. The overhead track formed with the track member constructed in accordance with the invention includes a continuous trolley member enclosing support portion having an integral downwardly-depending chain enclosure within which there is disposed a continuous driving chain of the overhead conveyor apparatus.

The term "chain enclosure" as used herein with respect to the present invention is intended to mean a structure which at least partially surrounds, but does not contact, any movable at least partially surrounded component.

The term "adjacent" as used herein with respect to the present invention is intended to mean nearby, but not contiguous.

2. Description of Relevant Art

There is known a general type of overhead trolley conveyor apparatus which employs a plurality of load-carrying trolley members which ride on an overhead track of the apparatus to convey materials from one point to another. Such an apparatus generally comprises a continuous loop overhead single track arrangement which is substantially horizontal with horizontal curves, and which may also include vertical curves if it is desired to convey material up or down from one level to another. A plurality of trolley members, each adapted to convey an individual load, ride along the overhead track arrangement of the apparatus. An exemplary trolley member construction comprises a pair of wheels, each mounted via wheel bearings to opposite ends of a horizontal shaft, with the wheels being adapted to ride along a horizontal surface of a track arrangement. The trolley member also includes, for example, a bracket affixed to the horizontal shaft, from which depends a load attachment member. A continuous chain is linked to each trolley member so as to convey the trolley members and their respective loads along the track, the chain being driven, for example, by a caterpiller drive unit. Such an overhead conveyor apparatus may be used to transport materials such as toys, electronic components, business machines, automotive parts, bulky furniture, tools, and a wide variety of other products.

The overhead track system employed in the above-described conventional conveyor apparatus is generally formed of a plurality of longitudinally joined rails, which may be joined by welding or other means, and which are supported at spaced intervals with standard hanger members which are secured overhead. The track members employed for forming the track system may take one of a number of known forms, such as an I-beam configuration or a substantially enclosed track having a square tubular configuration with a lower longitudinally extending slot.

Some of the most serious disadvantages attendant known overhead conveyor apparatus of the above-described type are: build-up of dirt, dust, overspray, and other contaminant materials on conveyor chain and track; costly deterioration of bearing and chain lubricants; corrosive attack on conveyor chain, bearings and rail; breakdowns in electrostatic spray equipment; production stoppage due to conveyor breakdowns; excessive maintenance costs; breakdown of lubricants which chain and bearings are exposed to temperature extremes; drip damage to clean parts from lubricants required to maintain system; and the high noise level associated with operation of the apparatus. Such noise is generated in part by the trolleys as they ride along the track, and in part by the chain which drives the trolleys.

Further, because the trolley members and the continuous chain are exposed in whole or in part, there is a danger of serious injury to workers operating the conveyor apparatus, should they accidentally come into contact with the moving parts of the apparatus while it is in operation.

The known track member constructions described hereinabove have had little or no success in eliminating the aforesaid disadvantages attendant overhead conveyor apparatus, and there has developed a desideratum for a track system which will substantially eliminate the aforesaid disadvantages and decrease the noise level associated with overhead conveyor apparatus, as well as to decrease the possibiliity of danger to workers.

The following disclosures are illustrative of known conveying apparatus.

U.S. Pat. No. 3,308,768 issued in 1967 to Orwin entitled "CONVEYORS FOR CONVEYING GOODS" discloses a conveyor track arrangement which includes a trolley track, and a separate chain supporting track disposed above the trolley track. The chain support track has disposed therein an endless chain having dependent trolley driving dogs which engage a trolley driving bar attached to the trolley body. The trolley tracks include horizontal guide support surfaces for the trolley wheels, and are generally of cruciform cross-section.

U.S. Pat. No. 3,875,866 issued in 1975 to Mazuyer entitled "OVERHEAD TRACK ASSEMBLY" discloses a conveyor track arrangement which includes a pair of rails defining a downwardly open channel. The rails are supported by the block portions of hangers so as to define a track for trolleys which are pushed along the track, and the upwardly facing surface of the rails receive and guide thereon the wheels of the trolley. The load support portion of the trolley extends downwardly between vertical portions of the rails.

U.S. Pat. No. 3,916,797 issued in 1975 to Block et al entitled "POWER DRIVEN CONVEYOR" discloses a track arrangement for a conveyor which includes two spaced horizontal tracks having inwardly-extending pins which carry roller wheels for supporting and conveying pallets between the two tracks. The spaced tracks include a lateral access portion which receives therein a conveyor chain such that the chain is substantially confined within opposite horizontal wall portions of the access opening.

U.S. Pat. No. 3,965,823 issued in 1976 to Bardot entitled "CONVEYORS" discloses a track arrangement for an overhead conveyor. The track is formed by a pair of rails which are substantially U-shaped in cross section, or may have the lower horizontal leg of the U-shaped removed, and which includes a central T-shaped groove having a surface which guides a pair of guide rollers on the trolley. The rails are secured to a special support which serves as a chair for the rails. The upper horizontal legs of the rails serves as the guiding surfaces for the trolley wheels.

The aforesaid relevant art arrangements, however, have individually and collectively failed to provide any satisfactory solution to the above-discussed shortcomings and disadvantages attendant trolley conveyor apparatus of the overhead power chain-driven type.

The present invention provides an effective solution to the aforesaid problems attendant overhead power driven convey apparatus by providing a track member for forming an overhead track which substantially reduces the high noise level and possibility of injury to workers normally associated with overhead conveyor apparatus. An overhead track system formed with the track members according to the present invention ensures that the wheels of the trolley members, as well as the chain of the conveyor apparatus, are effectively covered, so as to control noise normally associated with the operation thereof, as well as to enhance safety so as to aid in complying with Federal (O.H.S.A.) safety regulations.

SUMMARY OF THE INVENTION

The present invention provides an elongated track member for an overhead power chain driven trolley conveyor apparatus, the track member including an upper enclosure and an integral lower chain enclosure.

It is an object of the invention to provide a track member wherein the upper enclosure is defined by a top wall portion, first spaced apart downwardly-depending side wall portions, and a pair of spaced apart lower wall portions extending integrally from and substantially perpendicular to the side wall portions. The lower wall portions each include an upper surface which is adapted to support and guide the wheel of a trolley load support member of the apparatus which is adapted to ride along the track member. The lower chain enclosure includes a pair of substantially parallel spaced apart second side wall portions which are constructed and arranged not to contact any movable member, each of the second side wall portions extending integrally downwardly from one of the lower wall portions of the upper enclosure a sufficient distance to dispose therebetween and to be spaced apart from a chain link support portion of a trolley load support member of the conveyor apparatus.

A further object of the invention is to provide a track member which is integrally formed from a high-strength metal material. A wear-resistant noise control layer, such as of plastic, may optionally, but not necessarily be provided so as to extend along the inner surfaces of the lower wall of the upper enclosure and the side walls of the lower chain enclosure.

Another object of the invention resides in the provision of an overhead power driven conveyor apparatus wherein a plurality of the elongated track members according to the invention are longitudinally joined to form a continuous single overhead track supported by a plurality of hanger members at spaced intervals. The apparatus further includes a continuous chain member connected with a power drive unit, and a plurality of trolley members each operatively connected to the continuous chain member. When the trolley members are operably disposed so as to ride along the track formed by the track members, the chain link portion of the trolley member is disposed adjacent to but spaced apart from a central portion of the lower chain enclosure of the track member.

Other objects and details of the invention will become apparent from the following description, when read in conjunction with the accompanying drawings.

DETAILED DESCRIPTION OF PREFERRED EMBODIMENTS

Figure 1:
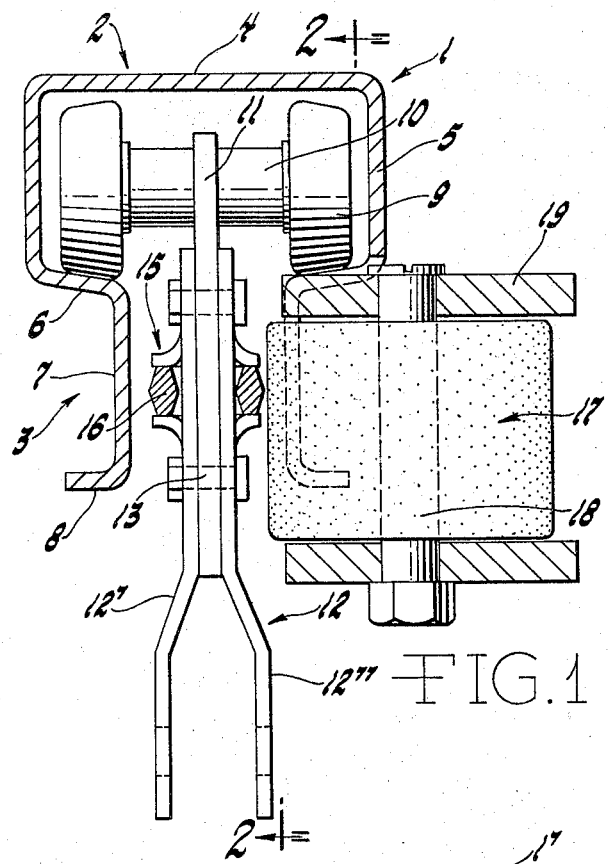
FIG. 1 depicts a sectioned front elevational view of a track member according to the invention, having a side roller guide member operably associated therewith, and a trolley member disposed for riding therealong.

With reference to FIG. 1, a first embodiment of a track member 1 in accordance with the present invention is depicted. The track member 1 comprises an integrally formed member fabricated, for example, of high-strength steel which is sufficiently strong to maintain strength and rigidity over long spans, and which desirably has a high corrosion-resistance. The thickness of the plate material forming track member 1 may be approximately 5/32 inch, by way of example.

The track member 1 includes, generally, an upper enclosure 2 and a lower chain enclosure 3, the respective structural details and functioning of which will be described in detail hereinbelow. It is to be understood that the track members described herein are all generally of the elongated type employed for use in conventional overhead trolley power-driven conveyor apparatus by longitudinally joining a plurality of the track members (such as by welding) to form a continuous loop track of the conveyor apparatus. In this connection, it will be understood that while in general the track members are straight, various horizontal and/or vertical curves may be formed therein where desired.

As shown in FIG. 1, the upper enclosure 2 of the track member 1 is defined by a substantially horizontal top wall 4, a pair of substantially vertical downwardly-depending side walls 5 extending from either end of top wall 4, and a pair of substantially horizontal lower wall portions 6 which extend integrally inwardly from the lower ends of the side walls 5. The upper substantially horizontal surface of each of the lower walls 6 define a trolley wheel guide and support surface, and in this regard such upper surface may be slightly angled as shown in FIG. 1, if the trolley wheels to be accommodated are of a somewhat angled wheel surface configuration.

The lower chain enclosure 3 of track member 1, formed integrally with upper enclosure 2, is defined by a pair of substantially vertical spaced apart side walls 7. The side walls 7 each extend integrally downwardly from the spaced apart inner ends of lower walls 6 of upper enclosure 2, and terminate at their lower ends in outwardly horizontally extending flanged parts 8.

The trolley load support member illustrated in FIG. 1 comprises a pair of trolley wheels 9, each connected such as by wheel bearings to opposite ends of a transverse horizontal axle or shaft 10. The upper surfaces of lower walls 6 of upper enclosure 2 of track member 1 support and guide the wheels 9 as they ride along track member 1. The upper portion of a bracket member 11 is received around and supported by axle 10 such that bracket member 11 is suspended downwardly from axle 10 so as to in turn support a load attachment member 12. Load attachment member 12 comprises a pair of members 12' and 12" secured on either side of bracket 11 by means of a pair of bolts 13 as shown. The lower ends of load attachment member 12 are spaced apart as shown, and each include an aperture 14 (FIG. 2) for loading purposes.

Figure 2:
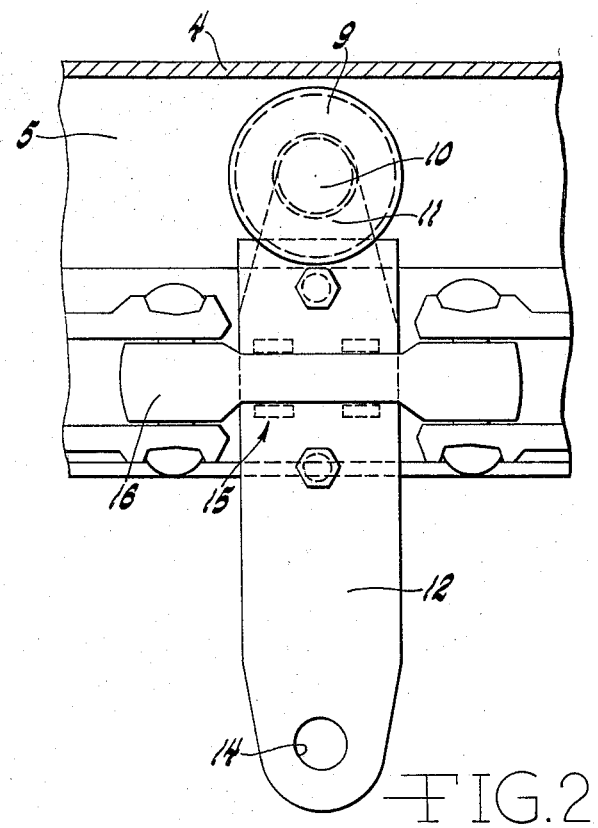
FIG. 2 is a view taken along line 2—2 in FIG. 1.

Disposed adjacent the upper portion of load attachment member 12 is a chain link support portion 15 formed by four outwardly extending guide members, as shown in FIGS. 1 and 2. With reference to FIG. 1, the chain link support portion 15 is substantially centrally disposed (in the vertical direction) between side walls 7 of chain enclosure 3. A link 16 of a continuous driving chain is received between the opposite pairs of the guide members forming chain support portion 15. The continuous chain is of known construction, and preferably is of the type which includes a universal joint at each pitch to provide maximum flexibility in all directions, and may be formed, for example, of high carbon steel.

As shown in FIG. 1, a portion of one of the side walls 7 of chain enclosure 3 may be interrupted at selected points so as to accommodate a roller member 17 rotatably supported on a shaft 18 and mounted by any suitable means, such as a pair of horizontal mounting members 19. The roller member 17 cooperates with the links 16 to guide the chain around curves. The provision of roller 17 is particularly advantageous at curving portions of the continuous track defined by the interconnected track members, to aid in smoothly guiding the endless chain around curves.

It will be understood from the foregoing that the longitudinally joined track members in accordance with the invention will define a continuous track assembly which includes a continuous upper enclosure 2 and a continuous lower chain enclosure 3. The upper enclosure 2 substantially encloses the trolley wheels 9 so as to minimize noise produced by the wheels as they ride along the upper surface of lower walls 6, whilee the lower chain enclosure 3 minimizes noise produced by the chain during operation. Further, because the trolley wheels and particularly the chain are substantially enclosed by the track member 1, the danger of injury to workers is substantially reduced. Another advantage afforded by the track member 1 is that, because the chain is substantially enclosed within chain enclosure 3, it will be protected from dirt and undesirable matter from the ambient, to thus prolong the wear life thereof.

It is further contemplated that the top wall 4 of upper enclosure 2 may be provided on the inner surface thereof with a horizontal trolley guide member 23 (FIG. 3) which extends between the two wheels 9 of the trolley to aid in guiding same, if desired. Alternatively, track member 1 may be formed by two symmetric halves which are spliced together along an upper seam portion which itself serves to define a horizontal guide member for aiding in the guiding of trolley wheels 9.

It is further contemplated that an inner wear-resistant noise control layer (not shown) may optionally, but not necessarily, be provided so as to extend, for example, along the inner surfaces of side walls 7 of chain enclosure 3 and along the inner surfaces of lower walls 6 of upper enclosure 2.

Figure 3:
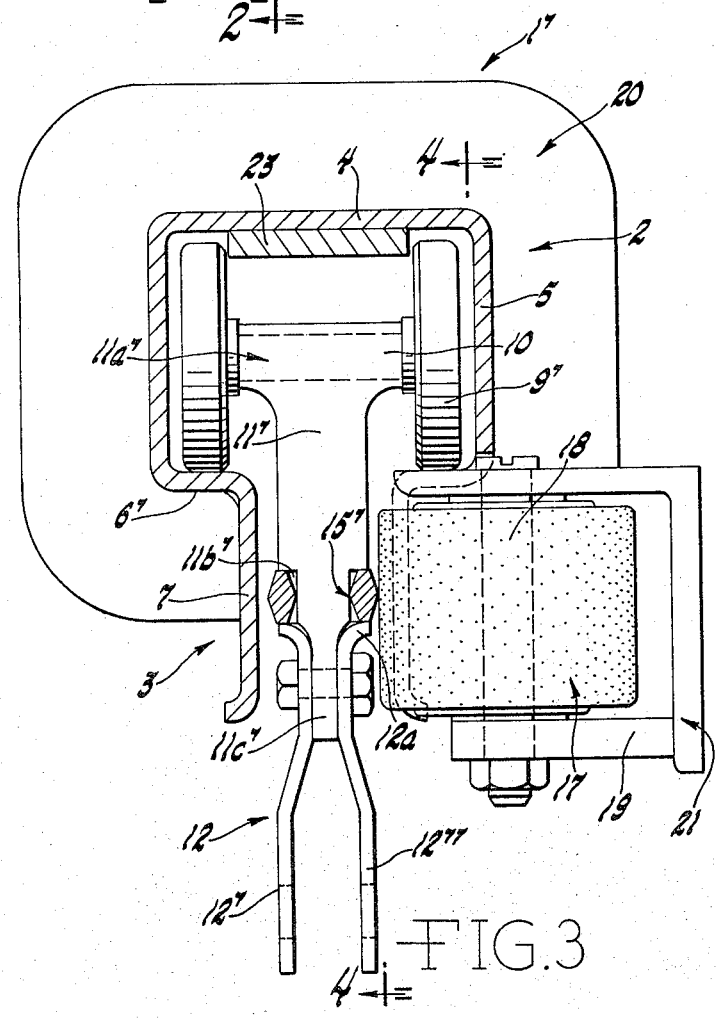
FIG. 3 illustrates a sectioned front elevational view of a track member according to a second embodiment of the invention, having a side roller guide member operably associated therewith, and a trolley member disposed for riding therealong.
Figure 4:
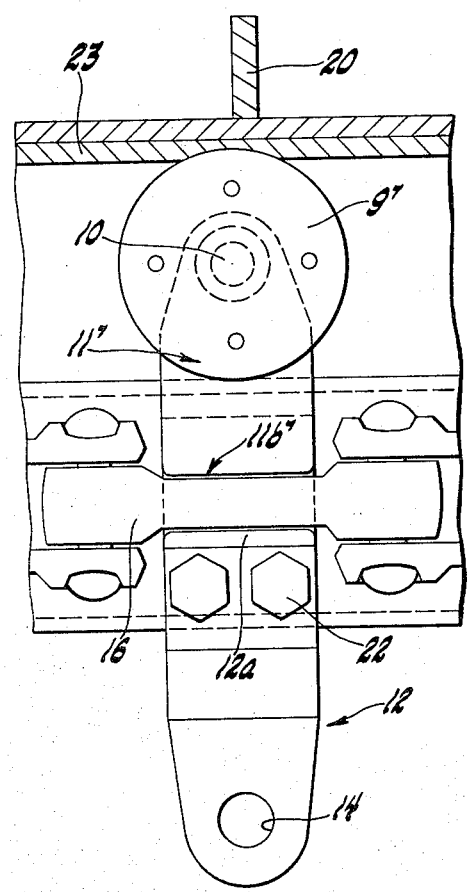
FIG. 4 is a view taken along line 4—4 in FIG. 3.

With reference to FIGS. 3 and 4, a second embodiment of the track member in accordance with the invention is depicted. The track member 1' is substantially identical in structural details to track member 1 described hereinabove, with the following exceptions. First, the lower walls 6' of upper enclosure 2, rather than being angled as in track member 1, are substantially horizontal in this embodiment, so as to properly guide trolley wheels 9' which have flat, rather than angled, wheel surfaces. Further, in this embodiment, the mounting means for roller 17 includes an L-shaped arm 21 combined with one of the horizontal mounting members 19. Arm 21 is supported by bracket members 20 which extend entirely around the periphery of upper enclosure 2 as shown.

Regarding the upper surface of the upper horizontal leg of arm 21 in this embodiment, as well as the upper surface of upper horizontal member 19 in FIG. 1, such surfaces serve to define a trolley wheel supporting and guiding surface along the interrupted portion of the side wall 7 for accommodating roller 17. Such surfaces may, but not necessarily, replace the upper surfaces of lower wall 6 or 6' which are also interrupted along the interrupted portion of the side wall 7, as shown.

The trolley member shown in FIG. 3 differ from that of FIGS. 1 and 2 in that bracket member 11' includes an upper portion 11a' which extends co-extensively with transverse axle 10 between the two trolley wheels 9' and the main body portion of bracket 11' is substantially thickened. Such construction provides added strength and stability for bracket member 11'.

The lower portion of bracket member 11' includes opposite recessed portions 11b', and the remaining lower portion of bracket member 11' is generally tapered inwardly to define a connection portion 11c' to which is secured by bolts 22 (FIG. 4) the upper ends 12a of members 12' and 12" forming load attachment 12. The upper ends 12a of attachment 12 are flanged outwardly, and together with the recessed portions 11b' of bracket 11' define the chain support portion 15'. The link 16 of the endless chain is received between the upper wall of recess 11b' and the upper end 12a defining chain support portion 15'. Such construction, viz., the cooperating portions of bracket 11' and attachment member 12, is adapted to closely receive therein the chain link 16, as shown in FIGS. 3 and 4.

In this embodiment, as in the above-described first embodiment, the chain support portion 15' is substantially centrally disposed (in the vertical direction) between side walls 7 of chain enclosure 3, or between one of the side walls 7 and roller 17 when the other one of side walls 7 is interrupted to accommodate roller 17.

Although there have been described what are at present considered to be the preferred embodiments of the invention, it will be understood that the invention may be embodied in other specific forms without departing from the spirit or essential characteristics thereof. The present embodiments are therefore to be considered as illustrative, and not restrictive. The scope of the invention is indicated by the appended claims rather than by the foregoing description.

I claim:

1. An overhead power driven conveyor apparatus, comprising:
   a plurality of elongated track members longitudinally joined to form a continuous single overhead track supported by a plurality of hanger members at spaced intervals;
   a power driven continuous chain member;
   a plurality of trolley members, each of said trolley members being operatively connected to said continuous chain member;
   each said trolley member including:
   a pair of wheels mounted for rotation to opposite ends of an axle member;
   load supporting means on said trolley comprising a downwardly depending bracket member supported by said axle member;
   a pair of load attachment members extending along one side of said bracket member;
   means securing said attachment members to said bracket in depending relationship;
   a pair of chain link support portions disposed adjacent the upper portion of each said load attachment member and respectively extending on opposite sides of said load supporting means, each said support portions defining at least a portion of a recess in which a portion of a rigid chain link is received;
   said bracket member including:
   an upper portion substantially coextensive longitudinally with the portion of said axle between said wheels and receiving and being supported by the latter axle portion;
   a depending main body portion;
   lower oppositely recessed portions and a lowermost inwardly tapered connection portion;
   said attachment members receiving and being connected to said connection portion in load supporting relationship; and
   each said attachment member having an outwardly flanged portion forming with said lower recessed portion one of the recesses for receiving a portion of said rigid link: and
   each of said elongated track members including:
   an upper enclosure defined by a top wall portion, first spaced apart downwardly-depending side wall portions, and a pair of spaced apart lower wall portions extending integrally from and substantially perpendicular to said side wall portions;
   said lower wall portions each including an upper surface thereof for supporting and guiding one of said wheels of said trolley member;
   a lower chain enclosure extending downwardly from said upper enclosure; and
   said lower chain enclosure including a pair of substantially parallel spaced apart second side wall portions which are constructed and arranged not to contact any movable member, each of said second side wall portions extending integrally downwardly from one of said lower wall portions of said upper enclosure a sufficient distance to dispose therebetween and to be spaced apart from said chain link support portions of said trolley member;
   said top wall portion of said upper enclosure being substantially horizontal, said first spaced apart side wall portions extending integrally and substantially vertically downwardly from each side of said top wall portions, and said lower wall portions of said upper enclosure extending integrally and substantially horizontally inwardly from said first side wall portions such that the inner ends thereof are spaced apart;
   said pair of spaced apart second side wall portions of said lower chain enclosure extending substantially vertically downwardly from the inner ends of said lower wall portions of said upper enclosure; and
   said chain link support portions of said trolley member being disposed adjacent to but spaced apart from a central portion of said lower chain enclosure of said track member.

2. An overhead power driven conveyor apparatus, comprising:
   a plurality of elongated enclosed track members longitudinally joined to form a continuous single enclosed overhead track supported by a plurality of hanger members at spaced intervals;
   a single, continuous, endless, power driven link chain;
   a plurality of trolley members, each of said trolley members being disposed within said enclosed track members, and being rigidly and non-rotatably connected to one and only one rigid associated link, respectively, of said single, continuous, endless, link chain;
   each said trolley member including:
   a pair of wheels mounted for rotation to opposite ends of an axle member;
   load supporting means on said trolley comprising a downwardly depending bracket member supported by said axle member;
   a pair of load attachment members receiving said bracket member and extending downwardly therefrom;
   each of said attachment members extending along one side of said bracket member;
   means securing said attachment members to said bracket in depending relationship;
   a pair of link support portions disposed adjacent the upper portion of each said load attachment member and respectively extending on opposite sides of said load supporting means, each said support defining at least a portion of a recess in which a portion of said associated rigid link is received;
   said bracket member including:
   an upper portion substantially coextensive longitudinally with the portion of said axle between said wheels and receiving and being supported by the latter axle portion;
   a depending main body portion;
   lower oppositely recessed portions and a lowermost inwardly tapered connection portion;
   said attachment members receiving and being connected to said connection portion in load supporting relationship; and
   each said attachment member having an outwardly flanged portion forming with said lower recessed portion one of the recesses for receiving a portion of said rigid link; and
   each of said elongated track members including:
   an upper enclosure defined by a top wall portion, first spaced apart downwardly-depending side wall portions, and a pair of spaced apart lower wall portions extending integrally from and substantially perpendicular to said side wall portions;

said lower wall portions each including an upper surface thereof for supporting and guiding one of said wheels of said trolley member;

a lower chain enclosure extending downwardly from said upper enclosure; and said lower chain enclosure including a pair of substantially parallel spaced apart vertical second side wall portions which are constructed and arranged not to contact any movable member, each of said vertical second side wall portions extending integrally downwardly from one of said lower wall portions of said upper enclosure a sufficient distance below said link support portions of said trolley member;

said top wall portion of said upper enclosure being substantially horizontal, said first spaced apart side wall portions extending integrally and substantially vertically downwardly from each side of said top wall portion, and said lower wall portions of said upper enclosure extending integrally and substantially horizontally inwardly from said first side wall portions such that the inner ends thereof are spaced apart;

said pair of spaced apart second side wall portions of said lower chain enclosure extending substantially vertically downwardly from the inner ends of said lower wall portions of said upper enclosure; and said link support portion of said trolley member being disposed within a central portion of said lower chain enclosure of said enclosed track member.

* * * * *